United States Patent [19]

Mohr

[11] 4,112,320
[45] Sep. 5, 1978

[54] ANISOTROPIC MAGNET STRUCTURE, PARTICULARLY SEGMENTAL MAGNET STRUCTURE FOR PERMANENT MAGNET DYNAMO ELECTRIC MACHINES

[75] Inventor: Adolph Mohr, Bühlertal, Fed. Rep. of Germany

[73] Assignee: Robert Bosch GmbH, Stuttgart, Fed. Rep. of Germany

[21] Appl. No.: 757,149

[22] Filed: Jan. 6, 1977

[30] Foreign Application Priority Data

Jan. 24, 1976 [DE] Fed. Rep. of Germany ....... 2602650

[51] Int. Cl.² ................... H02K 21/26; H02K 23/04
[52] U.S. Cl. ..................................... 310/154; 310/156
[58] Field of Search ................. 310/154, 156, 220–226

[56] References Cited

U.S. PATENT DOCUMENTS

| 3,594,599 | 7/1971 | West | 310/154 X |
| 3,939,371 | 2/1976 | Murakami | 310/154 |

Primary Examiner—Mark O. Budd
Attorney, Agent, or Firm—Flynn & Frishauf

[57] ABSTRACT

An elongated ferrite structure of barium or strontium ferrite is constructed of zones in which the ferrite materials are made to have different magnetic properties, the ferrite material located in the region of the highest demagnetizing stress placed thereon when incorporated into a dynamo electric machine, due to the armature reaction, being made of ferrite of high coercive force, the remaining regions of the magnet structure being made of ferrite material having high remanence, the entire structure being, preferably, a single element.

5 Claims, 1 Drawing Figure

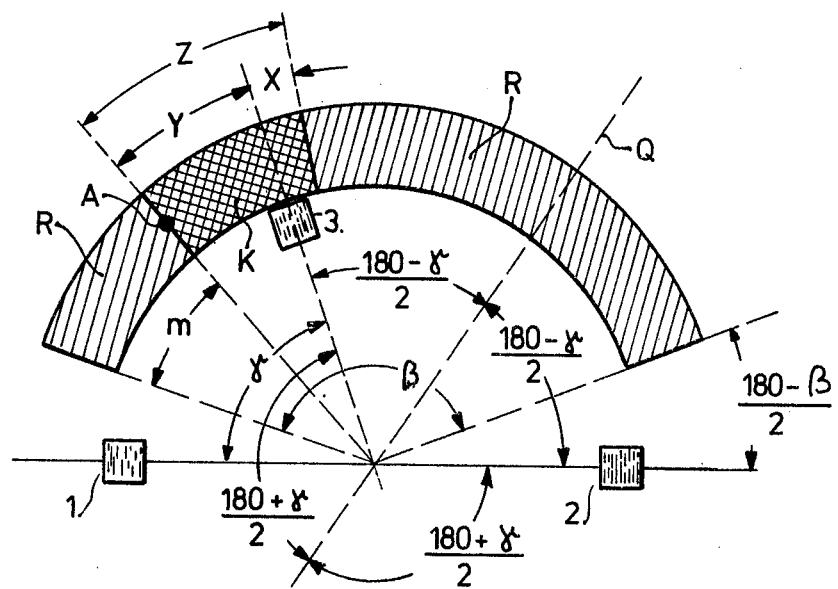

ANISOTROPIC MAGNET STRUCTURE, PARTICULARLY SEGMENTAL MAGNET STRUCTURE FOR PERMANENT MAGNET DYNAMO ELECTRIC MACHINES

CROSS REFERENCE TO RELATED APPLICATION

U.S. Ser. 618,574, filed Oct. 1, 1975, ODOR, MOHR and BOLENZ, assigned to the assignee of the present application.

The present invention relates to anisotropic magnet structures, and more particularly to segmental magnets for permanent magnet dynamo electric machines using ferrites of barium and/or strontium; and more especially to further developments in magnet structures forming the subject matter of the cross-referenced application Ser. 618,574, filed Oct. 1, 1975, of which the inventor hereof is a co-inventor, assigned to the assignee of the present application, and the disclosure of which is hereby incorporated by reference.

It is difficult to match the various requirements placed on magnet segments utilized in small d-c permanent magnet dynamo electric machines. On the one hand, the highest possible magnetic flux should be derived from the magnet while, on the other hand, the coercive field strength should be high, so that the magnet is essentially immune to demagnetization. The end portions of magnets, particularly segmentally shaped magnets, are particularly subject to demagnetization when used in motors having symmetrical, diametrically located brushes. Demagnetization effects are particularly dangerous upon starting under low-temperature conditions. Diametrical arrangement, as herein referred to, is deemed to mean diametrical with respect to the electrical poles of the machine. The permanent magnets which have been used heretofore and constructed on the basis of ferrite materials are a compromise: a predetermined design coercive strength is determined and then the highest possible remanence is associated therewith. Simultaneous increase of remanence and coercive field strength of segmental magnets by using ferrite materials.

Motors having symmetrical, diametrically arranged brushes have been proposed in which segmental magnets are placed having multiple components, the magnets being so constructed that at least the trailing edge of the magnet is made of highly coercive magnetic material whereas the remaining portion of the arc formed by the segmental magnet is made of magnetic material having high remanence. This is an improvement since in such motors the demagnetizing effect due to the armature reaction cross field is highest at the trailing edge of the magnet. Such magnets and their manufacture are disclosed in the aforementioned cross-referenced application.

Different types of motors will have different armature reaction fields, and investigations have shown that motors using a third brush, for example for an additional speed range, shift the armature reaction field from the trailing edge of the magnet towards the central range thereof. The magnets described in the aforementioned crossreferenced application, therefore, while suitable for their intended use, do not meet the requirements placed thereon when employed with different types of dynamo electric machines, for example three-brush motors.

It is an object of the present invention to provide a segmental magnet for permanent magnet dynamo electric machines, particularly d-c motors which, on the one hand, are essentially immune to demagnetizing effects due to the armature reaction cross field while, on the other, have high remanence, and which can be constructed to have maximum flux density with minimum volume. Such magnets, given a certain base area or surface should be constructed to have a minimum thickness so that the magnets can be built for use in motors which, with respect to power output per unit weight, dimension, operating noise, and resistance to demagnetization are improved over motors heretofore known. Additionally, the magnets should be capable of being made inexpensively and by using currently available manufacturing plants and apparatus already constructed and in use for oriented oxide magnets.

SUBJECT MATTER OF THE PRESENT INVENTION

Briefly, the magnet is constructed to use a highly coercive force ferrite which is placed in the zone subject to the highest demagnetization force due to armature reaction, when the magnet is incorporated in a dynamo electric machine. The magnet can be a multi-component magnet, each one of the components of the zone being made of elements which have constant magnetic properties within the respective zone; the magnet can also be constructed as a single unitary element, in which the various zones merge smoothly together without gaps. If gaps should occur, then they should, preferably, extend radially with respect to the center of rotation of the dynamo electric machine with which the magnet is to be used.

Motors using more than two brushes, for example three brushes, and capable of operating in two speed ranges, have armature reaction fields which provide heaviest magnetic stress in the range of the position of the third brush. Thus, motors having three brushes require magnets which are arranged for operation with the third brush, that is, upon operation in the second speed range, since stress on the magnet upon operation with diametrically energized brushes, in the first speed range, is less.

The invention will be described by way of example with reference to the accompanying drawings, wherein the single FIGURE is a highly schematic diagram of a segmental magnet for use in a dynamo electric machine, the armature of which has been omitted.

Three brushes 1, 2, 3 are shown, brushes 1, 2 being located diametrically across from each other, the third brush 3 being offset with respect to brush 1 by an angle Y. The magnet structure as such is shown at R which should have as high a remanence as possible; the zone of highest coercive force is shown at K, and additionally hatched transversely. Subscripts R and K will further be used to denote parameters associated with the respective zones of the magnet which has an overall angular extent $\beta$ with respect to a diametrical line connecting brushes 1, 2.

The magnetizing forces can be related as shown in equations (1), (2) of the attached table. The regions $x$ and $y$ can then be determined by solving for $x$ and $y$, as shown in equations (3), (4). The overall region Z of the zone of high coercivity K is then determined by equation (5) wherein $V_K$ is the volume of the high-coercive magnet material and $V_{Ges}$ is the overall volume of the magnetic structure. The line Q indicates the axis of the armature cross field.

Equation (5) permits calculation of the ratio of the volume of the high-coercive magnetic material to the overall volume of the magnetic material with respect to the coverage angle $\beta$ of the magnet as well as the coercive force $_IH_c$ of the respective ferrite masses or ferrite materials.

For optimum arrangement of the magnet, the position of the zone of highest intrinsic coercive force within the segmental magnet must be determined. As seen in the figure, the start of the zone of intrinsic high coercive force starts at an angle $m°$ from the edge of the magnet. This position is shown in the figure at A.

Equation (6) will be apparent from the drawing; substituting $y$ from equation (4) and re-arranging of the equation results in equation (7). For an operative example in which the respective intrinsic coercive forces are given as in data (A), (B), (C) and (D) - listed on the attached table between equations (7) and (8) with the results, upon substitution, found in equation (8). Equation (8) shows that the zone of high coercive force should have 26% of the overall volume and starts, as calculated in equation (9), at an angle 25° from the edge of the magnet.

This magnet for motors with a third brush will be the optimum magnet having an intermediate zone of high intrinsic coercive force with edges or terminal zones of highly remanent magnetic material.

The demagnetization field strength $H_{ent.max.}$ is defined by equation (10). The field strength at the edges of the segmental magnet, upon operation with brushes 1 and 2, is defined by equation (11). Comparison of equations (10) and (11) shows that it is less than the demagnetization field strength at position A, that is, when the thickness of the magnet for the second speed range at the position A is matched to that of the high remanence materials, it will also meet the requirements for operation in the first speed range.

Manufacture of a magnet for a three-brush motor: Strontium ferrites are used, each one being capable of providing a sintered magnet having the following properties: For magnet portion mass K:

$$_IH_c = 320 \; kA/m, \quad B_r = 350 \; mT.$$

For mass R:

$$_IH_c = 256 \; kA/m, \quad B_r = 380 \; mT.$$

Ferrites of the types above disclosed can be made in accordance with known technology.

The ferrite masses are separately prepared, as known, and then transformed into paste form with about 23% water content. The masses are injected over a plurality of injection ducts into a hollow mold. The injection ducts for the highly remanent mass R at the end portions of the magnets as well as for the high-coercive field portion K intermediate the magnets, are appropriately located in accordance with the calculated position of the respective zones. The proportion of the material, as determined by equation (8), shows that the volume $V_K$ of the high-coercive strength material is about 26% of the overall volume of material, in order to result in a magnet of optimum structure. Cross-sectional areas of the respective ducts leading to the respective regions of the mold form are accordingly dimensioned to provide the respective volumes. The injection of the pasty mass is preferably not carried out simultaneously but, rather, with time shift. First, highly remanent magnetic material is injected at the end portions of the magnets; the high-coercive material is injected thereafter. This temporal shift is desirable so that the high-coercive mass is not pressed towards the ends of the magnets, and to form junction surfaces which extend in essentially radial direction, or as close to radial as possible. If any separating zones should occur, they should, also, preferably extend radially, or as close to it as possible.

After injecting the masses into the mold, the material is dehydrated and pressed. The various ferrite particles are magnetized by subjecting them to a magnetic field. After compression, the structure is again demagnetized, sintered at between 1200° to 1250° C and then ground to size, as customary in the manufacture of sinter magnets. It has been found that the junction between the two magnetic materials or, rather, types of magnetic material, is interlocking and smooth, and no gap, seam or separation could be determined. No difference is found upon grinding of the magnets with respect to a magnet which is made singly of a unitary structure.

It is also possible to make the various magnetic zones forming the overall segmental magnets separately, grind them, and then join them together, for example by an adhesive, after grinding. This method of manufacture may be desirable when making magnets for larger motors which have substantial dimensions.

The segmental magnets as described are particularly useful in d-c motors with permanent magnetic fields and especially for miniature and sub-miniature motors which use a third, unsymmetrically located brush for a second speed range. The motors operate with less noise, have lower weight for a given power output and are particularly stable in operation under cold conditions and when subject to high demagnetizing fields. The field generated by such magnets is essentially independent of loading of the motor. The field strength is high and, with a given outer diameter of the motor, a larger air gap made possible than in previously known motors.

The segmental magnet structure permits the manufacture of a new class of permanent magnet field d-c motor having minimum weight for a given power output, with improved magnetic stability as well as with improved loading characteristics in operation of the motor, without introducing substantial additional cost factors and their manufacture.

Various changes and modifications may be made within the scope of the inventive concept.

$$\frac{I^H cR}{I^H cK} = \frac{\frac{180 - \gamma}{2} - x}{\frac{180 - \gamma}{2}} \tag{1}$$

$$\frac{I^H cR}{I^H cK} = \frac{\frac{180 - \gamma}{2} - Y}{\frac{180 - \gamma}{2}} \tag{2}$$

$$x = \frac{180 - \gamma}{2} \cdot \left(1 - \frac{I^H cR}{I^H cK}\right) \tag{3}$$

$$y = \frac{180 + \gamma}{2} \cdot \left(1 - \frac{I^H cR}{I^H cK}\right) \tag{4}$$

$$\frac{Z}{\beta} = \left(1 - \frac{I^H cR}{I^H cK}\right) \cdot \frac{180}{\beta} = \frac{V_K}{V_{Ges}} \tag{5}$$

-continued $$m = \gamma - y - \frac{180 - \beta}{2} \quad (6)$$

$$m = \frac{\gamma}{2} + \frac{\beta}{2} + \frac{I^H cR}{I^H cK}\left(90 + \frac{\gamma}{2}\right) - 180 \quad (7)$$

$$\left.\begin{array}{l} I^H cR = 256\ kA/m;\ B_r = 380\ mT \\ I^H cK = 320\ kA/m;\ B_r = 350\ mT \\ \gamma = 70°;\ \beta = 140° \end{array}\right\} \begin{array}{l} \text{Data for} \\ \text{Example} \end{array}$$

$$\frac{V_K}{V_{Ges}} = (1 - 0{,}8) \cdot \frac{180}{140} = 0{,}26 \quad (8)$$

$$m = 35 + 70 + 0{,}8\ (90 + 35) - 180 = 25° \quad (9)$$

$$H_{ent.max.} \cdot \frac{I^H cR}{I^H cK} = 0{,}8 \cdot H_{ent.max}, \quad (10)$$

$$H_{ent.max} \cdot \frac{\beta}{180} \approx 0{,}78 \cdot H_{ent.max}, \quad (11)$$

I claim:

1. In combination with a three-brush motor, having two electrically diametrically located brushes and the third brush positioned unsymmetrically between said two brushes, a magnet structure having an elongated arcuate magnet element consisting of a ferrite selected from the group of at least one of: barium, strontium, said magnet element having zones of ferrite material with different magnetic properties with respect to coercivity and remanence, wherein the ferrite material of high coercive force is located intermediate the arcuate extent of the magnetic element and unsymmetrically with respect to its length and positioned in the angular region of the third, unsymmetrically positioned brush, and the end portions of the structure adjacent said material of high coercive force comprises ferrite material of high remanence.

2. The structure of claim 1, wherein the proportion of volumes of the material of high coercive type and high remanence type are selected in accordance with the relationship, $$\frac{Z}{\beta} = \left(1 - \frac{I^H cR}{I^H cK}\right) \cdot \frac{180}{\beta} = \frac{V_K}{V_{Ges}}$$

wherein the index $R$ denotes the material of high remanence, the index $K$ the material of high coercivity, $V$ indicates the volume, and $V_{Ges}$ the entire volume of the structure, the angle $\beta$ being the coverage angle of the structure.

3. Structure according to claim 2, wherein the material of the high coercive type is spaced from the trailing edge of the material by an angle of $m$ degrees as defined by the relationship $$m = \frac{\gamma}{2} + \frac{\beta}{2} + \frac{I^H cR}{I^H cK}\left(90 + \frac{\gamma}{2}\right) - 180$$

wherein $\gamma$ is the brush offset angle of the third, unsymmetrically positioned brush.

4. Structure according to claim 1, wherein the structure is a single unitary structural element.

5. Structure according to claim 1, wherein the magnet is arcuate, and said portion of ferrite material of high coercivity type comprises about one-quarter the volume of the overall magnet, and the beginning of the zone of high coercivity type material starts at about 26% from one end portion of the magnet.

* * * * *